March 17, 1953     J. L. BROCKMEIER     2,631,304
AUTOMOBILE BED FOR JUVENILES
Filed March 27, 1950
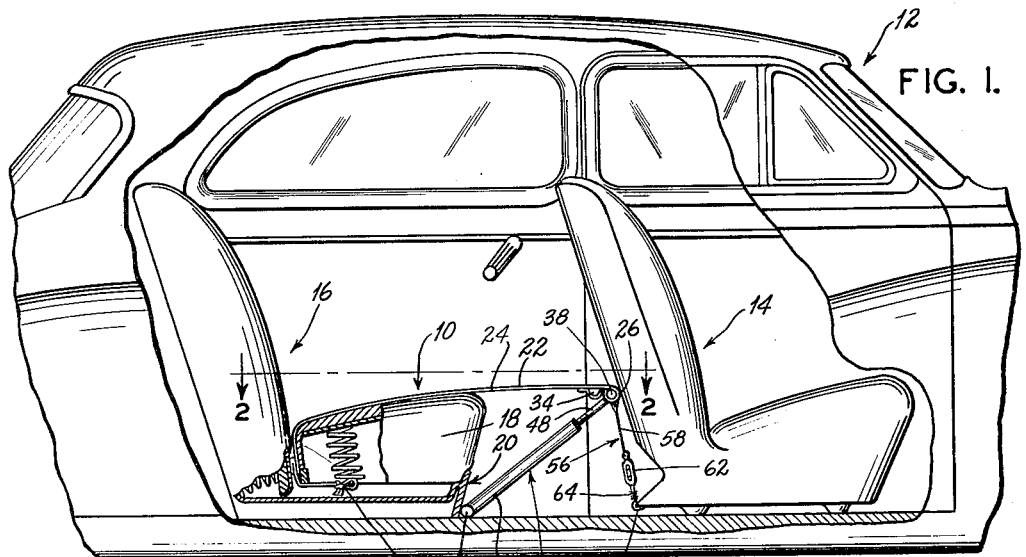
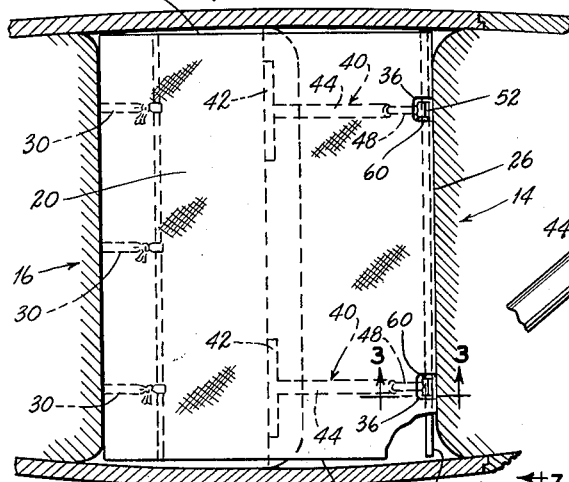
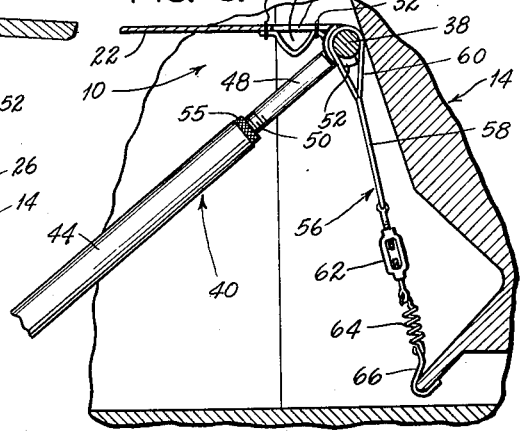
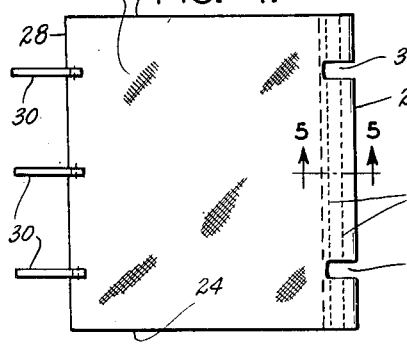
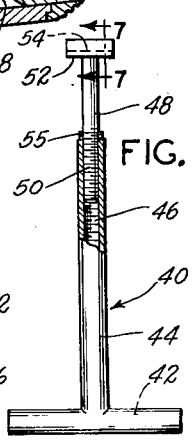
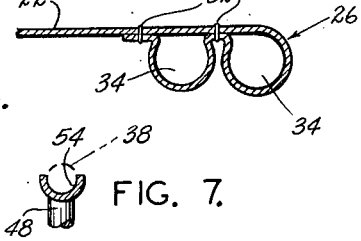
INVENTOR:
JOHN L. BROCKMEIER,
By Kingsland, Rogers & Ezell
ATTORNEYS Patented Mar. 17, 1953

2,631,304

UNITED STATES PATENT OFFICE 2,631,304

AUTOMOBILE BED FOR JUVENILES

John L. Brockmeier, St. Louis, Mo.

Application March 27, 1950, Serial No. 152,238

3 Claims. (Cl. 5—118)

The present invention relates generally to the bed art and more particularly to a novel bed for juveniles for use in the rear seat compartment of an automobile, or the like.

In one form, the bed comprises a canvas panel containing straps adjacent its rear edge for fastening it to the rear seat cushion of an automobile. The body of the panel extends forwardly on top of the rear seat cushion to a position above the floor and adjacent the back of the front seat of the automobile. The front edge of the panel contains a series of spaced transversely extending passageways, one of which receives an elongated rod. Adjustable struts extend diagonally upwardly from the base of the rear seat to the rod so as to support it, and adjustable yieldable members extend downwardly from the rod to the bottom edge of the front seat so as to tension the panel.

As is well known to those who travel by automobile with small children, it is always a problem to provide a suitable bed in the automobile for them so that they can sleep en route without falling into the space between the front and rear seats. Also, with the advent and popularity of the drive-in type theaters it has been found advantageous to provide some means for sleeping the small children who tend to fall asleep during the performance.

Many different types of beds have been improvised by parents who have been faced with this problem, but most of these have met with very little success because they have been cumbersome, uncomfortable, etc.

It is an object of the present invention, therefore, to provide a novel collapsible bed for juveniles for use in the rear seat compartment of automobiles and the like.

Another object is to provide an automobile bed for juveniles which can be easily and quickly installed by an inexperienced person with a minimum amount of instruction.

Another object is to provide an automobile bed which, once it has been installed, can be easily and quickly changed to an inoperative position to permit the rear seat to be used in the usual manner without completely removing the bed from the automobile.

Another object is to provide an automobile bed which can be adjusted to fit the rear seat compartment of any standard size automobile.

Another object is to provide an automobile bed which can be used with substantially all body styles and which is not affected by the forward tilting movement of the back portions of the front seats of two door type automobiles or the sliding adjustment of the front seats.

Another object is to provide an automobile bed which occupies a minimum amount of space in both the operative and inoperative positions.

Further objects are to provide an automobile bed which is of simple design, which is relatively inexpensive, which contains a minimum number of parts, and which is of rugged construction to withstand hard usage by children.

Further objects and advantages of the present invention will be apparent from the following description, reference being had to the accompanying drawing wherein a preferred embodiment of the present invention is shown, in which:

Fig. 1 is a side elevational view of a bed constructed in accordance with the teachings of the present invention, shown installed in the back seat compartment of an automobile; the side of the automobile and a portion of the back seat being cut away to better illustrate the construction of the bed.

Fig. 2 is a top plan view of the back seat compartment and bed taken on the line 2—2 in Fig. 1;

Fig. 3 is an enlarged fragmentary vertical sectional view taken on the line 3—3 in Fig. 2;

Fig. 4 is a top plan view of the panel member shown removed from the automobile;

Fig. 5 is an enlarged fragmentary vertical sectional view taken on the line 5—5 in Fig. 4;

Fig. 6 is an enlarged elevational view of one of the struts shown removed from the automobile; and Fig. 7 is an enlarged fragmentary vertical sectional view taken on the line 7—7 in Fig. 6.

Referring to the drawing more particularly by reference numerals, 10 indicates generally a juvenile bed embodying the teachings of the present invention, shown installed in the rear seat compartment of an automobile 12 (Fig. 1).

The automobile 12 contains a front seat 14 and a rear seat 16. The latter includes a seat cushion 18 which fits into a well or frame 20.

The bed 10 includes a flexible panel member 22 of canvas or like material (Fig. 4) having opposed side edges 24, a front edge 26, and a rear edge 28. As shown in Figs. 1 and 2, when installed, the rear portion of the panel member 22 is disposed on top of the rear seat cushion 18 with the rear edge 28 thereof disposed downwardly and in back of the cushion 18.

Fastened adjacent the rear edge 28 are a plurality of longitudinally extending tie straps 30, the free ends of which are fastened to the spring supporting rods of the cushion 18, as by tying.

The front edge 26 of the panel member 22 is doubled back upon itself (Fig. 5) and contains a series of spaced transversely extending lines of stitches 32 to provide a plurality of passageways 34 extending between the side edges 24.

Extending rearwardly from the front edge 26 are a pair of spaced notches 36 which extend across the passageways 34.

A cross bar 38 is removably disposed in one of the passageways 34. The bar 38 is of a length to extend from one side edge 24 to the opposite edge and is exposed at the notches 36.

A pair of adjustable struts 40 extend diagonally upwardly from the front panel of the supporting frame 20 to the bar 38 at the notches 36, so as to support the same.

Each strut 40 (Fig. 6) includes a T-shaped tubular member having a short transverse portion 42 and an elongated body portion 44, the free end of the latter containing internal threads 46.

A rod-like member 48 having external threads 50 at one end thereof, is threadedly disposed in the free end of the body portion 44. The other end of the rod-like member 48 contains a channel-like portion 52 rotatably fastened thereto and which contains a groove 54 (Fig. 7) of a size to receive the cross bar 38.

A knurled lock nut 55 is disposed on the threaded portion of the rod-like member 48 adjacent the end of the body portion 44.

A pair of yieldable tensioning members 56 extend downwardly from the cross bar 38 adjacent the notches 36 to the lower rear edge of the front seat 14.

Each member 56 includes a cord 58 which has a loop 60 at one end thereof. The loop 60 is removably disposed around the cross bar 38 adjacent a notch 36. A turn-buckle 62 is fastened to the other end of the cord 58 and a coiled spring 64 is fastened to the turn-buckle 62. A hook 66 is fastened to the other end of the coiled spring 64 and is removably disposed in holding engagement with the lower rear edge of the front seat 14.

To install the bed 10 in the rear seat compartment of the automobile 12, the rear seat cushion 18 is lifted out of the supporting frame 20 and the tie straps 30 fastened to the spring supporting rods in the cushion 18.

The panel member 22 is then folded over the top of the seat 18 so as to extend forwardly therefrom, and the seat 18 is replaced in the frame 20. The front edge 26 is extended toward the back of the front seat 14 and the cross bar 38 partially inserted through the particular passageway 34 which permits the cross bar 38 to be as close as possible to the back of the seat without touching it.

As the cross bar 38 is inserted through the passageway 34, the loops 60 of the tensioning members 56 are disposed in the notches 36 and the cross bar 38 inserted through them at the same time that it is inserted completely through the passageway 34.

The channel-like portions 52 of the struts 40 are placed against the cross bar at the notches 36 so that the bar is seated in the grooves 54, and the transverse portions 42 are then positioned against the front panel of the frame 20.

The hooks 66 on the end of the tensioning members 56 are hooked under the rearwardly extending bottom edge of the front seat 14.

The bed 10 is then adjusted so that the cross bar 38 is approximately level with the front edge of the rear seat cushion 18 when the panel member 22 is taut. This is accomplished by loosening the knurled lock nut 53, threading the rod-like member 48 either inwardly or outwardly, as the case may be, and then tightening the lock nut 55. Because the channel-like portion 52 is rotatably mounted on the end of the rod-like member 48, this adjustment can be made without disengaging the channel-like portion 52 from the cross bar 38. Concurrently with this adjustment of the struts 40, the tensioning members 56 are adjusted by means of the turn-buckles 62 so that the panel member 22 is taut when the cross bar 38 is immediately adjacent the rear surface of the front seat.

When children jump up and down on that portion of the panel member 22 which extends forwardly of the notch 18, the coiled springs 64 will yield and permit the panel member 22 to flex without tearing. Also, the coiled springs 64 yield somewhat when that portion of the panel 22 is used as a bed so as to provide greater sleeping comfort.

If the knotted portions of the tie straps 30 yield a little, or, if for any other reason the cross bar 38 is caused to bear against the back of the front seat 14, the cross bar 38 can be removed and replaced in the next passageway 34 farthest from the front edge 26 of the panel member 22. This adjustment is also advantageous when the front seat is moved forward or backward to adjust for leg room in the front compartment.

When not in use as a bed, the hooks 66 are disengaged from the front seat 14, the struts 40 are removed, the tensioning members 56 positioned alongside of the cross bar 38, and the front portion of the panel member 22 rolled up around the cross bar 38 and the tensioning members 56. After the forward portion of the panel member 22 has been rolled up, the middle portion of the panel member is draped over the front of the rear cushion 18 and the rolled-up portion placed on the floor of the automobile adjacent the front panel of the frame 20. The struts 40 can be stored under the front seat 14, in the trunk of the automobile, or any other place convenient to the operator or user.

With the bed 10 in this inoperative position, the back seat of the automobile can be used in the usual manner, the only difference being that there appears to be an additional seat cover. By using a panel member 22 which is the same color as the seat covers, the additional covering is hardly noticeable.

When it is desirable to have a bed in the back seat, the panel 22 can be unrolled and the bed placed in the operative position as described previously.

Thus it is apparent that there has been provided a novel automobile bed for juveniles, which fulfills all of the objects and advantages sought therefor.

When the bed 10 is in the operative position, substantially the entire space below the panel member 22 and between the front and rear sets is free to be used for storage. This is particularly advantageous when travelling because water jugs and the like, which are in constant demand, are immediately available without having to stop the automobile and dig them out of the trunk.

The bed is exceedingly simple to install, and once it has been installed it can be easily and quickly changed from the operative position to the inoperative position, and vice-versa, in a matter of minutes.

The various adjustments for varying the length of the panel member 22, the tensioning members 56 and the struts 40 are simple in operation yet positive in their action.

It is to be understood that the foregoing description and the accompanying drawing have been given only by way of illustration and example, and that changes and alterations in the present disclosure, which will be readily apparent to one skilled in the art, are contemplated as within the scope of the present invention, which is limited only by the claims which follow.

What is claimed is:

1. A juvenile bed for the rear seat compartment of automobiles and the like, comprising a flexible panel member having a front edge and a rear edge; means for removably fastening the rear edge of the panel member adjacent the rear edge of the rear seat cushion of an automobile; and means for removably supporting the front edge of the panel member above the floor and adjacent the back of the front seat of an automobile, said last named means including an elongated rigid member, means adjacent the front edge of the panel member for receiving said elongated member whereby it will extend transversely thereto, a strut-like member having the upper end thereof shaped to receive said elongated member, and yieldable tensioning means for connection between the elongated member and the bottom edge of the front seat of an automobile.

2. A juvenile bed for the rear seat compartment of automobiles and the like, comprising a flexible panel member having a front edge and a rear edge; means for removably fastening the rear edge of the panel member adjacent the rear edge of the rear seat cushion of an automobile; means for removably supporting the front edge of the panel member above the floor and adjacent the back of the front seat of an automobile, said last named means including an elongated rigid member, means adjacent the front edge of the panel member for receiving said elongated member whereby it will extend transversely thereto, an adjustable strut-like member having the upper end thereof shaped to receive said elongated member so as to support the same; and an adjustable tensioning member having a yieldable portion for connection between the elongated member and the bottom edge of the front seat of an automobile.

3. A juvenile bed for the rear seat compartment of automobiles and the like, comprising a flexible panel member having a front edge and a rear edge; means for removably fastening the rear edge of the panel member adjacent the rear edge of the rear seat cushion of an automobile, an elongated rigid member; a plurality of spaced transversely extending passageways in the panel member adjacent the front edge thereof of a size to receive said elongated member; a strut-like member adjustable lengthwise and having the upper end thereof shaped to receive the elongated member so as to support the same; and an adjustable member having a yieldable portion for tensioning the panel member, and adapted to be connected between the elongated member and the bottom edge of the front seat of an automobile.

JOHN L. BROCKMEIER.

REFERENCES CITED

The following references are of record in the file of this patent:

UNITED STATES PATENTS

| Number | Name | Date |
|---|---|---|
| 1,082,223 | Bradley | Dec. 23, 1913 |
| 1,134,312 | Bradley | Apr. 6, 1915 |
| 1,267,979 | Cook | May 28, 1918 |
| 1,473,413 | Young | Nov. 6, 1923 |
| 1,544,505 | Tope | June 30, 1925 |
| 1,620,433 | Brye | Mar. 8, 1927 |
| 1,959,974 | Westgate | May 22, 1934 |
| 2,357,729 | DeFries | Sept. 5, 1949 |
| 2,531,096 | Allers | Nov. 21, 1950 |
| 2,564,480 | Jones | Aug. 14, 1951 |

OTHER REFERENCES

Popular Mechanics, Article by H. R. Willis, page 174, January 1949, 5-94.